(12) United States Patent
Jarisch (10) Patent No.: US 8,176,840 B2
(45) Date of Patent: May 15, 2012

(54) BREWING DEVICE AND BREWING CAPSULE SYSTEM WITH A CAPSULE HOLDER FOR FACILITATING INSERTION AND REMOVAL OF CAPSULES

(75) Inventor: Christian Jarisch, Paudex (CH)

(73) Assignee: Nestec S.A., Vevey (CH)

( * ) Notice: Subject to any disclaimer, the term of this patent is extended or adjusted under 35 U.S.C. 154(b) by 640 days.

(21) Appl. No.: 12/301,584

(22) PCT Filed: May 22, 2007

(86) PCT No.: PCT/EP2007/054902
§ 371 (c)(1),
(2), (4) Date: Apr. 23, 2009

(87) PCT Pub. No.: WO2007/135135
PCT Pub. Date: Nov. 29, 2007

(65) Prior Publication Data
US 2009/0293736 A1 Dec. 3, 2009

(30) Foreign Application Priority Data
May 24, 2006 (EP) .................................... 06114447

(51) Int. Cl.
*A47J 31/40* (2006.01)
(52) U.S. Cl. ......................... 99/289 R; 99/295; 99/302 P
(58) Field of Classification Search ................. 99/289 R, 99/295, 302 P
See application file for complete search history.

(56) References Cited

U.S. PATENT DOCUMENTS

| 4,389,925 A * | 6/1983 | Piana ........................... 99/289 R |
| 5,755,149 A | 5/1998 | Blanc et al. ................... 99/289 T |
| 5,776,527 A | 7/1998 | Blanc ............................... 426/77 |
| 7,461,584 B2 * | 12/2008 | Blanc et al. ..................... 99/280 |
| 2002/0148357 A1 * | 10/2002 | Lazaris et al. ................... 99/295 |
| 2006/0130665 A1 | 6/2006 | Jarisch et al. ................... 99/279 |
| 2006/0230941 A1 | 10/2006 | Ryser et al. ..................... 99/275 |
| 2009/0308258 A1 * | 12/2009 | Boussemart et al. ........... 99/295 |

FOREIGN PATENT DOCUMENTS

| EP | 1 090 574 B1 | 4/2001 |
| EP | 1 219 217 B1 | 7/2002 |
| EP | 1 444 932 B1 | 8/2004 |
| EP | 1 495 702 A1 | 1/2005 |

(Continued)

OTHER PUBLICATIONS

International Search Report PCT/EP2007/054902 Dated Aug. 9, 2007.

(Continued)

Primary Examiner — Reginald L Alexander
(74) Attorney, Agent, or Firm — Winston & Strawn LLP (57) ABSTRACT

A brewing device for the brewing of a capsule containing beverage ingredients. This device includes a frame, first and second capsule enclosing members for at least partially enclosing the capsule during brewing, wherein the first enclosing member is mobile along the frame in relation to the second enclosing member, a closing mechanism to actuate the first enclosing member, the closing mechanism including an actuation member; a capsule holding member for receiving the capsule during insertion of the capsule between the first and second enclosing members and for holding it in place during closing of the enclosing members.

24 Claims, 6 Drawing Sheets

FOREIGN PATENT DOCUMENTS

| | | |
|---|---|---|
| WO | WO 94/02059 | 2/1994 |
| WO | WO 95/17121 | 6/1995 |
| WO | WO 98/47418 A1 | 10/1998 |
| WO | WO 01/30218 A1 | 5/2001 |
| WO | WO 2005/004683 A1 | 1/2005 |
| WO | WO 2005/058111 A1 | 6/2005 |

OTHER PUBLICATIONS

Notice of Opposition European Patent No. EP 1859714 B1, May 24, 2006.

Applicant's reply to Opposition of European Patent No. EP 1859714 B1 with new claims, Nov. 11, 2011.

* cited by examiner

BREWING DEVICE AND BREWING CAPSULE SYSTEM WITH A CAPSULE HOLDER FOR FACILITATING INSERTION AND REMOVAL OF CAPSULES

This application is a 371 filing of International Patent Application PCT/EP2007/054902 filed May 22, 2007.

The invention generally relates to a brewing device of a beverage or a liquid comestible adapted to handle a capsule containing ingredient(s) which is able to produce a beverage or liquid comestible when interacting with a liquid, such as for example, hot pressurized water, introduced into the volume of the capsule.

In the field of beverage capsule system such as coffee machines, the machines have been widely developed in which a capsule containing beverage ingredients is inserted in a brewing device for being brewed by injection of a fluid under pressure. The brewing device is tightly closed about the capsule; water is injected at a first face of the capsule; the beverage is produced in the closed volume of the capsule and is drained through the second face and collected into a receptacle such as a cup or glass.

It is important to provide a user-friendly capsule loading and ejection principle in the brewing device which requires as less intervention of the user as possible. In particular, this enables to provide a higher throughput of capsules brewed in the device and less waiting time before two brewing cycles.

Several patent publications have already been published for this object.

Patent Application EP 1 090 574 A1 relates to an extraction device comprising a pair of jaws (i.e., enclosing members) with a fixed jaw part and a movable jaw part, the latter being articulated to and moved over the fixed part, and a closing lever mechanism with a plurality of arms is associated therewith to close the movable part over the fixed part.

In the published document WO 01/30218 A1, the principle is similar but a mechanism for ejecting the capsule is additionally provided, associated with a pulling arm of the movable jaw so as to detach the capsule from the bottom of the extraction chamber when the jaw is reopened.

Patent EP 1444 932 relates to an extraction module with linear closure for the pressurised preparation for a drink from a capsule comprising two sub-assemblies for introduction of a capsule and means for fixing and positioning the capsule which can be displaced in a coaxial manner in relation to the linear displacement of the mobile extraction sub-assembly. The fixing and positioning means is capable of being displaced linearly by the second sub-assembly into a displaced position such as to permit a closing of the two sub-assemblies around the capsule.

The loading and ejection principles of the brewing devices of the prior art remain complicated with two many pieces and moving elements which make the brewing devices more costly to produce and potentially more vulnerable to failures.

Patent application WO 2005/004683 relates to a device for extracting a beverage from a capsule comprising a first part and a second part movable with respect to the first part, provided with a space for insertion of the capsule. The capsule is a cup with rigid edges and is guided in such a way that it is possible to insert the capsule in an intermediate position and the mobile part moves the capsule from its intermediate position to the extraction position. The capsule can be maintained by static or retractable holding means in the intermediate position which is not coaxial with the axis of extraction but slightly offset. The movable part is configured to force the capsule to pass the holding means toward the extraction position and be re-aligned in the axis of extraction.

However, this solution is not appropriate for insertion of capsules having more flexible edges which can become deformed in many different ways before insertion such as "coffee pods". Coffee pods can be made of softer material such as soft plastic and/or aluminium foils, filter papers, etc, and their edge can be of a geometry more or less accurate with folded parts that can be due to just the manipulation of the capsule by the user or for other reasons. Therefore, proper handling of such type of capsules has led to complicated solutions as well such as those described in U.S. Pat. No. 5,755,149; U.S. Pat. No. 5,776,527; EP 1 219 217 and already discussed EP 1444 932.

The problem may come from the fact that the capsule is finally more difficult to handle; and so requires more precautions for being properly taken from the insertion position to the extraction position. Therefore, the prior art solutions have essentially consisted in moving both enclosing parts toward the capsule itself while the capsule is maintained by other movable parts that retracts or are sandwiched between the moving parts. Finally, the resulting solutions are complicated and costly to manufacture.

An object of the present invention is to propose a solution that is simpler, in particular, which involves less moving pieces so is more reliable and less expensive to produce.

The invention relates to a brewing device for the brewing of a capsule, more preferably comprising a foldable sealing edge, containing beverage ingredients comprising a frame and a first and second capsule enclosing members for at least partially enclosing the capsule during brewing. At least one of the first or second enclosing members can be mobile along the frame between an open and a closed position about the capsule. A closing mechanism can be provided to actuate the first enclosing member between the two positions comprising an actuation member. A capsule holding member is also provided for receiving the capsule during insertion of the capsule between the first and second enclosing members and for holding it during closing of the enclosing members about the capsule. According to an aspect of the invention, the capsule holding member is fixed (i.e., non-moving) with respect to the first enclosing member and mobile with respect to the second enclosing members. The holding member has a holding chamber for holding the capsule against gravity between the enclosing members. The holding member has a non-supporting area which is placed adjacent the holding chamber for removal of the capsule. The capsule holding chamber is also preferably larger than the said second enclosing member so that the second enclosing member traverses the holding member for both pushing the capsule against the other (first) enclosing member in closure about the capsule and for placing the said capsule above the non-supporting area for removal of the capsule during relative re-opening of the holding members.

Therefore, the device of the invention provides both holding and an ejection functions using a mechanical assembly which is simpler than the existing ones. The device can be used for capsules such as "coffee pods" with deformable edges in reliable manner.

In a more particular arrangement, the holding chamber comprises at least a coaxially arranged holding surface to hold the edge of the capsule against gravity which is slightly larger than the second enclosing member to enable it to traverse the holding chamber during the closure motion.

Preferably, the at least one holding surface is also arranged in a non-retractable manner to not substantially mechanically interact with the said traversing enclosing member. Less mechanical interaction is beneficial to prevent complexity, premature wearing and blocking problems of the device.

The holding surface comprises at least a portion of tube coaxially and circumferentially oriented about the traversing (second) enclosing member. More particularly, the holding chamber may comprise two portions of tube radially spaced apart with a central opening; wherein the said portions of tube hold respectively two lower portions of the edge of the capsule. As a result the capsule can be held in a stable manner even when the edge has been slightly folded.

The capsule holding member can be a single piece or an assembly of different pieces. However, according to the invention, the number of pieces can be significantly reduced without detriment to the performance of the device.

The second enclosing member and the capsule holding member are arranged to be mobile relative one another. The capsule can so be moved from the holding chamber to the ejection chamber simply by effect of the holding member and second enclosing member being moved closer one another.

More particularly, the holding chamber and the ejection chamber are separated by a transversal surface retaining means that opposes a certain resistance in flexure of the flexible edge of the capsule in the longitudinal direction during the longitudinal transfer of the capsule from the holding chamber to the ejection chamber. The retaining means are forced to be passed by the capsule's foldable edge during closing of the device. In particular, the one enclosing member can force at least a portion of the capsule to flex sufficiently to pass the retaining means beyond the holding chamber. The capsule can therefore be forced to position itself from the prepositioning in the holding chamber to the brewing configuration at the closing of the enclosing members. In the brewing position, the holding chamber may no longer hold the capsule. In particular, the capsule may be placed above the non-supporting area thus being able to fall when the enclosing members are separated during re-opening.

For instance, the transversal retaining means can be placed between the holding chamber and the ejection chamber. The retaining means can be arranged to let the capsule pass by effect of the flexure of the edge of the capsule. For instance, the transversal retaining means comprises at least one portion of ridge arranged to hold the capsule substantially slanted upward orientation along the longitudinal closing direction. The transversal surface retaining means can comprise at least two spaced apart arc-shaped surface portions of ridge.

One advantage of the slanted orientation is that the overall width of the holding member can be reduced. The thinner the holding member, the more precise can be the closure about the capsule with lower risk of blockage.

The retaining means can be a surface of ramp serving as a guiding surface for the capsule during insertion and prepositioning between the enclosing members. The retaining means can be at least one arc-shaped portion onto which the edge of the capsule can rest. The retaining ramp can thus substantially demarcate the transversal limit between the holding and ejection chamber.

In a possible mode, the retaining means can be flexible such as be resilient flanges that can hold the capsule along its edge at rest but flex sufficiently to let the capsule pass therethrough under the force exerted by the enclosing member during closure. In this mode, the capsule can have flexible or non-flexible edges.

The holding chamber can be arranged to hold the capsule in place in a position which is slightly inclined relative to the enclosing plane; i.e., the transversal plane passing by the edge of the capsule when the capsule is enclosed between the enclosing members for brewing. For this, the ramp is slanted relative to the enclosing plane.

The holding chamber of the holding member can comprise an insertion opening, such as an elongated slot, for enabling the capsule to be inserted in. The capsule is inserted in the holding chamber by gravity fall or by any possible assisted insertion means (e.g., a pusher or drawer).

The ejection chamber of the holding member also comprises an opening for ejection of the capsule, e.g., to fall by gravity.

The ejection opening can be substantially placed adjacent the holding chamber and opposite the capsule's insertion opening.

The opening is uncovered for the capsule to be released when the second enclosing member and the capsule holder are moved away relatively one another; i.e., during reopening of the enclosing members of the device.

In a mode, the capsule holding member is fixed to the first enclosing member. The holding means could be a separate but attached element to the first enclosing member via connection means. Alternatively, it could also be moulded or cast as an integral part of the first enclosing member.

The second enclosing member can be non-movable, i.e., fixed to the frame. The second enclosing member can bear puncturing elements and/or filtering elements which cooperate with the capsule to respectively open a side of the capsule and/or filter the beverage coming out of the capsule.

The first enclosing member is moved in closure toward the second enclosing member. For this, actuation means are provided to transfer mechanical forces to the enclosing member. The first enclosing member can bear water injection means that are adapted to inject pressurized water into the capsule when the enclosing members are closed in the fluid tight manner about the capsule.

The first enclosing member can be moved between the open and closed position by a closing mechanism which comprises an actuation member and force transmission means.

Preferably, the force transmission means provides a variable transmission rate enabling to increase the output force without significantly increasing the input force. For instance, the variable force transmission means can be a pair of spur gear with non-circular sections acting in an intermeshing relationship The invention further relates to a brewing capsule system for the brewing beverage comprising a capsule comprising a pad containing beverage ingredient(s) formed by the assembly of two packaging walls around a mass of beverage ingredient(s) and a peripheral foldable sealing edge for closing said pad and a brewing device as aforementioned. In the brewing capsule system, the capsule can have a lenticular shape and may contain ingredients in a compacted form such as coffee powder.

The capsule pad can have a disc shape. It can contain ground coffee, for instance, compacted ground coffee.

Further advantages, features and objects of the present invention will become apparent from the following detailed description of preferred embodiments of the present invention in conjunction with the figures of the enclosed drawings.

FIG. 1 shows a perspective view of the brewing device of the present invention in the open position for inserting a capsule in.

Figure 1:
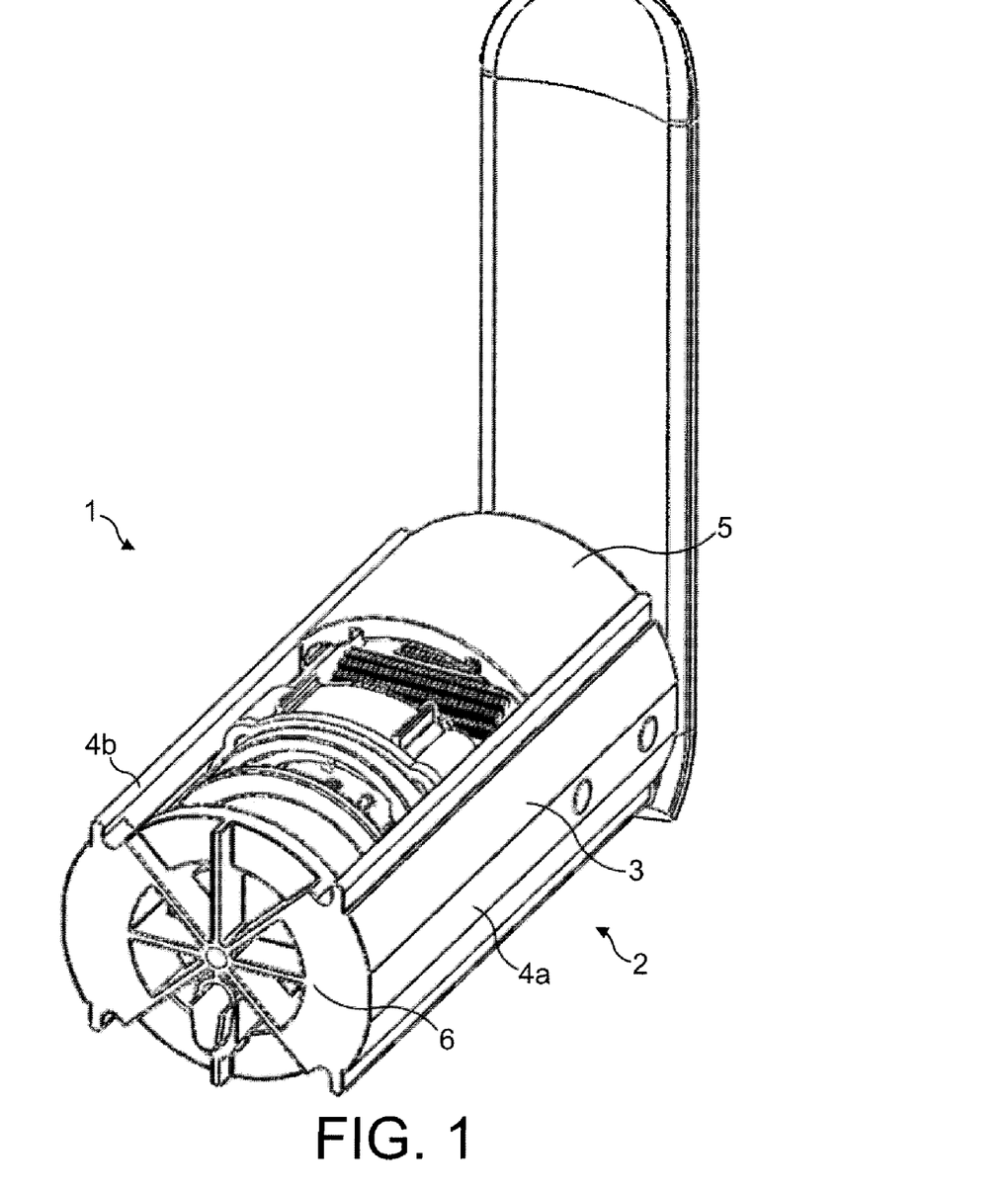

The present invention relates to a brewing device referenced in FIG. 1 by numerical reference 1. The device comprises a frame or chassis 2. The brewing device can be a module which can be integrated in different beverage production machines, especially coffee brewing machines. It can constitute an independent module which only needs to be connected to a supply for pressurized water (supplied e.g. from a pump connected to a thermoblock or boiler).

The main frame 2 can be composed of a left frame portion 4a, a right frame portion 4b, an upper frame portion 5 and a front beverage outlet portion 6.

The frame can be manufactured in full plastic or metal or a combination of plastic and metal. The portions can be made of injected or extruded pieces. FIG. 1 shows an embodiment with a full plastic frame produced by injection.

Figure 2:
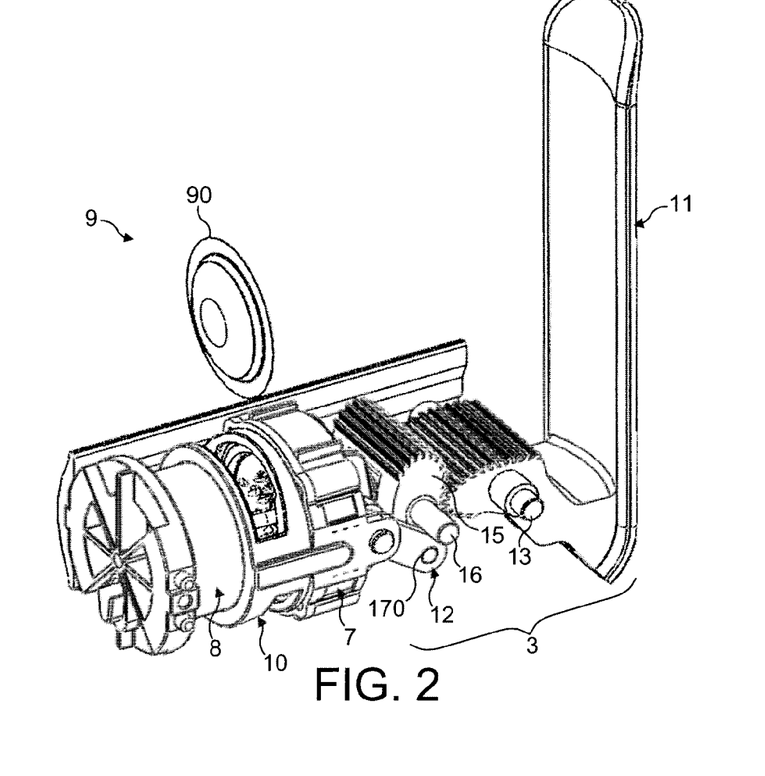
FIG. 2 shows a perspective view with the sidewall of the brewing device removed.
Figure 3:
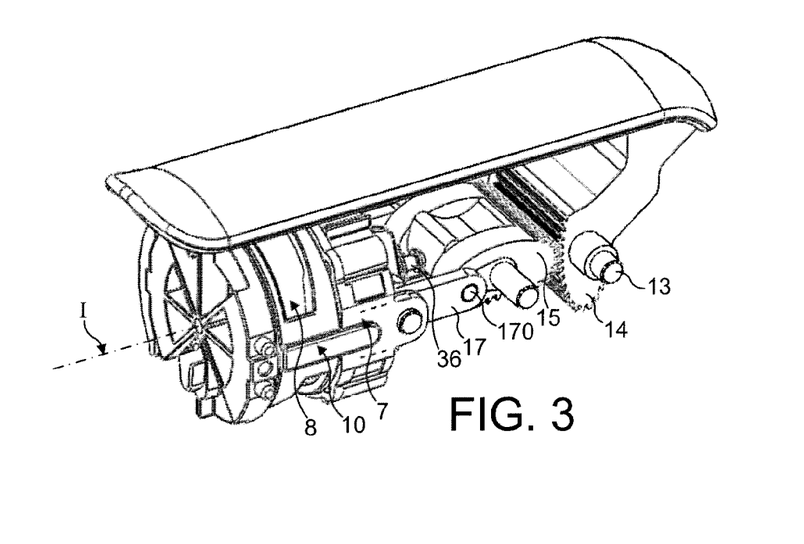
FIG. 3 shows a perspective view with the sidewall of the brewing device removed but in closed position.

FIGS. 2 and 3 illustrate the brewing device with the upper and left frame portions being removed for more clarity of the mechanical principles.

The device comprises two enclosing members, respectively a first and second enclosing members 7, 8; which are positioned relatively in a spaced apart relationship in the open position in FIG. 2 for enabling insertion of a capsule 9 in the device.

According to an aspect of the invention, a capsule holding member 10 is provided in the open gap left in open position between the enclosing members to receive and hold the capsule in its descent in the brewing device.

In the disclosed embodiment, the first enclosing member is mounted along the frame, i.e., the two side portions 4a, 4b to be capable of reciprocating along a substantially longitudinal median axis I. The second enclosing member 8 is placed in the frame in a non-movable position, i.e., fixed position. Therefore, for closure of the enclosing members about the capsule 9, the first enclosing member 7 is forced to come closer to the second enclosing member 8 up to a position where it can form a fluid tight engagement with the second enclosing member at peripheral matching surfaces while pinching the edge 90 of the capsule in-between in the closed position of FIG. 3.

The brewing device has a closing mechanism 3 comprising actuating means 11 and force transmission means 12 which enable to transfer the manual effort of the user to the first enclosing member. For this, the actuating means can be a lever which is pivotally mounted on the frame via pivot axle 13. The lever transfers the user's effort on force transmission means which provides preferably a variable transmission that enables to progressively increase the piercing forces on the capsule and the closing forces transferred to the enclosing members 7, 8 while not significantly increasing the user's effort on the lever The variable transmission further provide a progressive slowing down of the speed of the enclosing member 7 during closure. The variable transmission means can be formed of non-circular spur gear means; respectively, a rear master gear 14 and a front slave gear 15 having substantially ellipsoidal shapes.

The gears 14, 15 are positioned relative one another with their longer axis placed at about 90 degrees one relative to the other. The gears are respectively mounted along the frame via rear axle 13 and front axle 16. The spur gear means further connect at the front along axle 170 to additional transmission means 17 such as a pair of parallel rods. The additional transmission means 17 forms with the front gear 15, a knee joint mechanism. The general principle of knee joint mechanism is know 'per se' and used to provide a steady closure of the enclosing members. However, in present case, the knee joint mechanism is partly formed by the gear means and partly formed by the rod means. This provides a new assembly with both a variable transmission rate and steady closure.

A detail description of the closing mechanism of the brewing device is given in co-pending European patent application filed on the same day as the present application and entitled: "Brewing device for capsule with closure mechanism of variable transmission ratio"; the description of which is enclosed herein by reference.

Figure 4:
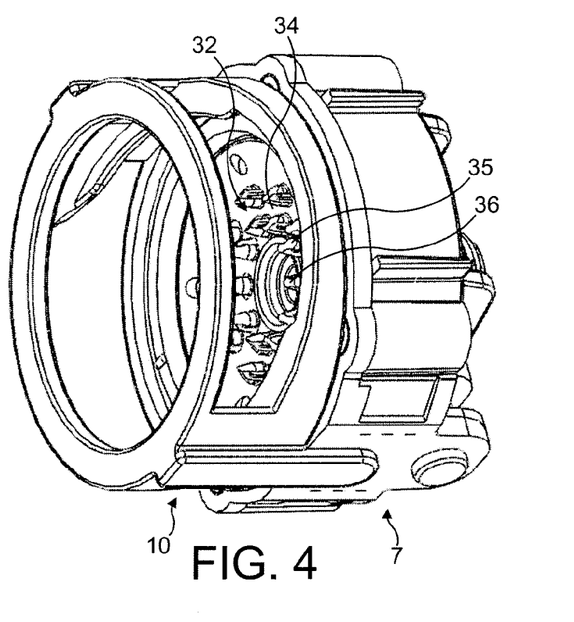
FIG. 4 shows the assembly formed by the enclosing member and holding member.
Figure 5:
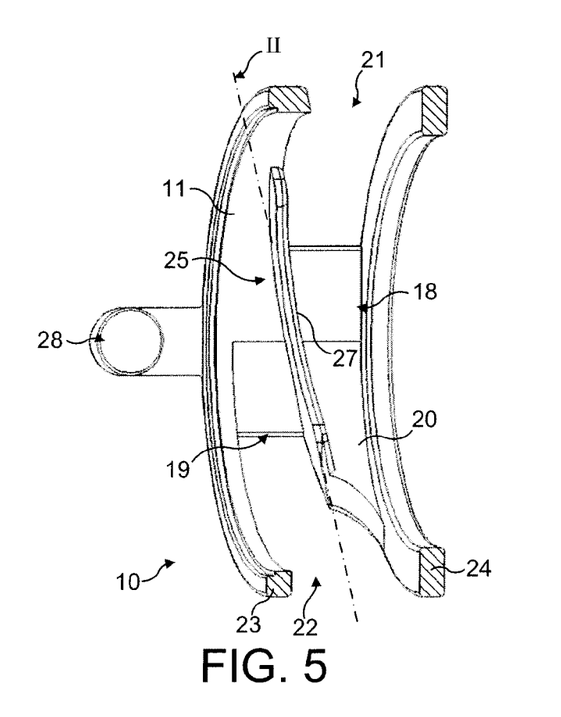
FIG. 5 shows the holding member as such.

FIGS. 4 and 5 show in greater detail the capsule holding member 10. The holding member has the general cylindrical or "ring" form. It comprises a first chamber or holding chamber 18 arranged to receive and hold the capsule in a prepositioning place when the brewing device is in the open position of FIG. 2. It also comprises a second chamber or ejection chamber 19 arranged to receive the capsule when the brewing device is closed and therefore enable the capsule's removal as soon as the brewing device is re-opened. The holding chamber 18 is delimited by coaxial holding surfaces 20 that hold the edge of the capsule against gravity. The transversal cross-section of the surfaces 20 are slightly larger than the enclosing member 8 so as to enable the enclosing member to traverse relatively the holding chamber. The portions of cylinder 20 are such that the capsule can stand in a substantially upright or slightly inclined position.

In the upper region of the chamber, an opening 21 is provided which is of sufficient width to enable the capsule to be inserted in the chamber 18 by effect of gravity.

The ejection chamber 19 is placed adjacent the holding chamber. It has a lower opening 22 substantially opposite the capsule insertion hole 21 for the capsule to fall freely by gravity when the brewing device is re-opened after brewing.

The holding member 10 has a rear cylindrical portion 23 and front cylindrical portion 24 of diameter slightly larger than the external diameter of the second enclosing member 8 in order for the enclosing member to slide in the holding member 10 during closing.

The two chambers 18, 19 of the holding member are separated by a capsule retaining means 25. This capsule retaining means are oriented transversally to the sliding (closing) direction. This means can be, for instance, a ramp surface comprising a pair of arc-shaped ridges 27 onto which the edge 90 of the capsule can be supported. The ramp surface can be slightly inclined (Axis II) relative to the enclosing plane. The portions of ridges 27 protrude inwards in the radial direction and are dimensioned to retain the edge of the capsule on both sides of the capsule. The size of the portions of ridges is given by the diameter of the enclosing member 8. For instance, it can be about 1-4 mm.

The holding member is fixed on the lateral sides of the first enclosing member 7 by a pair of rearwardly protruding arms 28. Therefore, the holding member is fixed or static relative to the first enclosing member 7 but mobile relative to the second enclosing member 8 in longitudinal direction along axis I during the closure movement.

As shown in FIG. 4, water injection means 32 can be provided in a shallow recess of the enclosing member 7 which are configured to inject water under pressure in the capsule when the brewing device is tightly closed. The water injection means can comprise at least one water inlet and eventually piercing elements 34.

In order for the capsule to be more easily and reliably released from the recess, a movable pusher 36 (FIGS. 3 and 4) can be provided through the enclosing member 7 to push the capsule out of the recess as the enclosing members re-open. As a result, the capsule is disengaged from the piercing elements 34 and falls down by gravity through the opening 22.

The reciprocating motion of the pusher 36 is coordinated by the closure mechanism 3. As shown in FIG. 3, the pusher is associated to a cam means of the spur gear 15.

FIGS. 6 to 10 illustrate the closure process of the brewing device of the invention.

Figure 6:
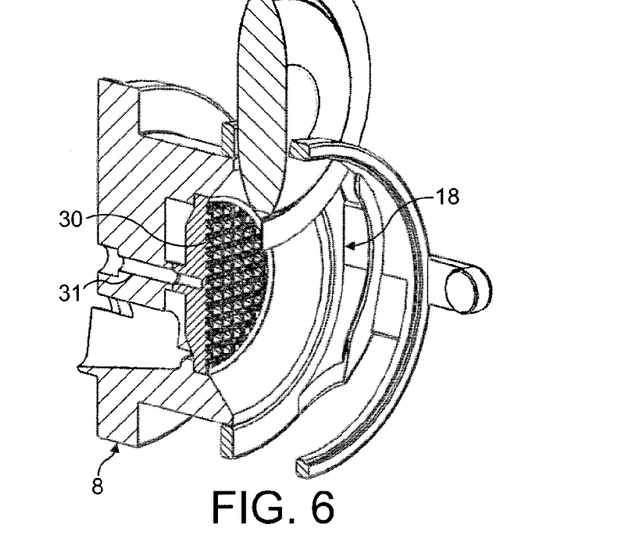
FIGS. 6 to 10 show partial detailed views of the step of insertion, closing and ejection of the capsule in the brewing device.

In FIG. 6, the brewing device is opened for receiving a new capsule. For this, the first enclosing member is retracted in the position of FIG. 1. The upper opening 21 of the holding member is uncovered and a capsule can thus be inserted in.

Figure 7:
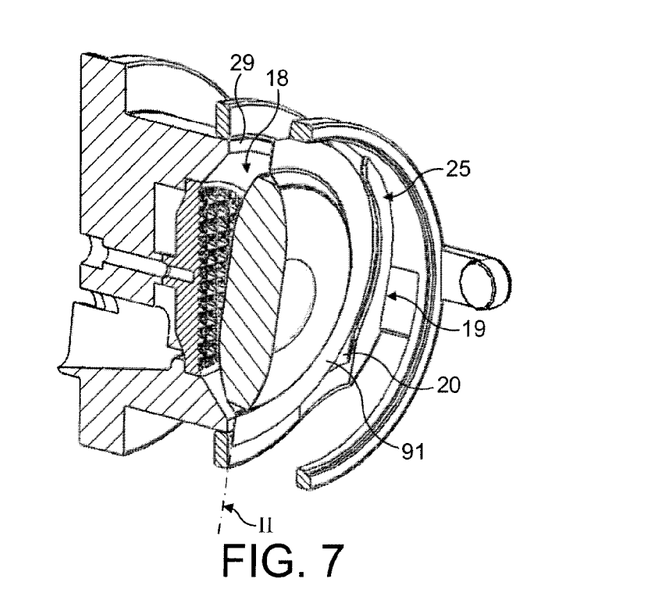

In FIG. 7, the capsule is shown now resting in place in the holding chamber 18 both on the cylindrical surfaces 20 and against the ramp surfaces of the transversal retaining means 25 in a slightly inclined position. The enclosing members are still spaced apart one another.

Figure 8:
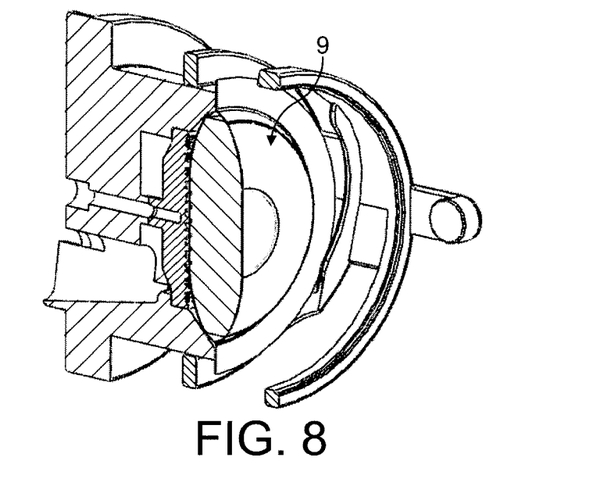

In FIG. 8, the lever is actuated in closure of the enclosing members. The first (rear) enclosing member 7 is slidably activated forwards by the closure mechanism 3. As a result, the holding member 10, which is fixed with respect to the enclosing member 7, is forced to translate in direction of the second (front) enclosing member 8 causing it to slide through the holding member 10 and consequently to push the capsule in the direction of and finally against the internal surface (not shown) of the first enclosing member 7. The capsule is thus forced to pass the transversal retaining means 25. The edge of the capsule is deformable or flexible enough to allow the capsule to be displaced from the chamber 18 to the other chamber 19. The capsule can successfully be prevented from falling through the opening 22 of the ejection chamber 19 before the final closure during this transfer because the chamber 19 is sufficiently short (in width), the closing mechanism is relatively rapid and furthermore the piercing elements 34 tends to prick the surface of the capsule early due to the shallow recess of the enclosing member 7 thus preventing a too early descent of the capsule.

Figure 9:
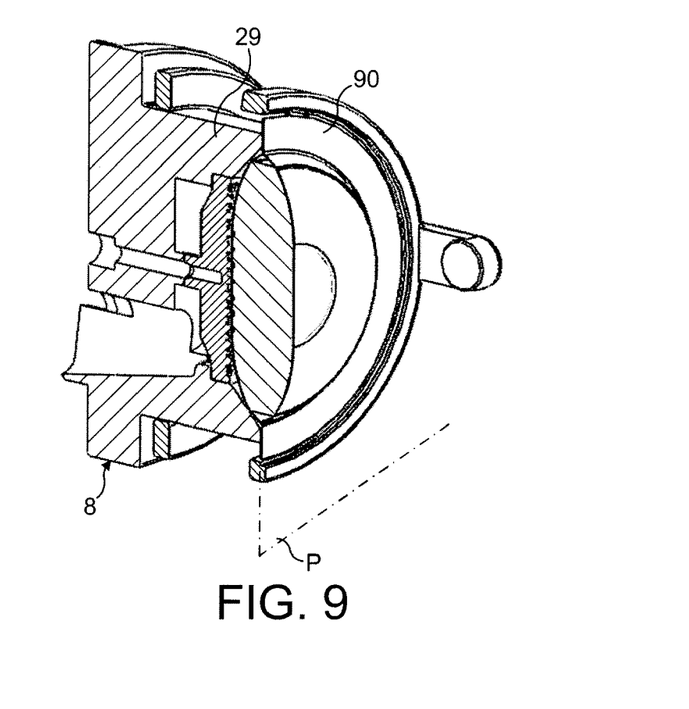

In FIG. 9, the first and second enclosing members are closed in fluid tight pressure resistant manner about the capsule. The edge of the capsule 90 is finally pressed between the edge of the first member (not shown) and the edge 29 of the second enclosing member 8. The capsule is thus in the brewing position along holding plane P.

Figure 10:
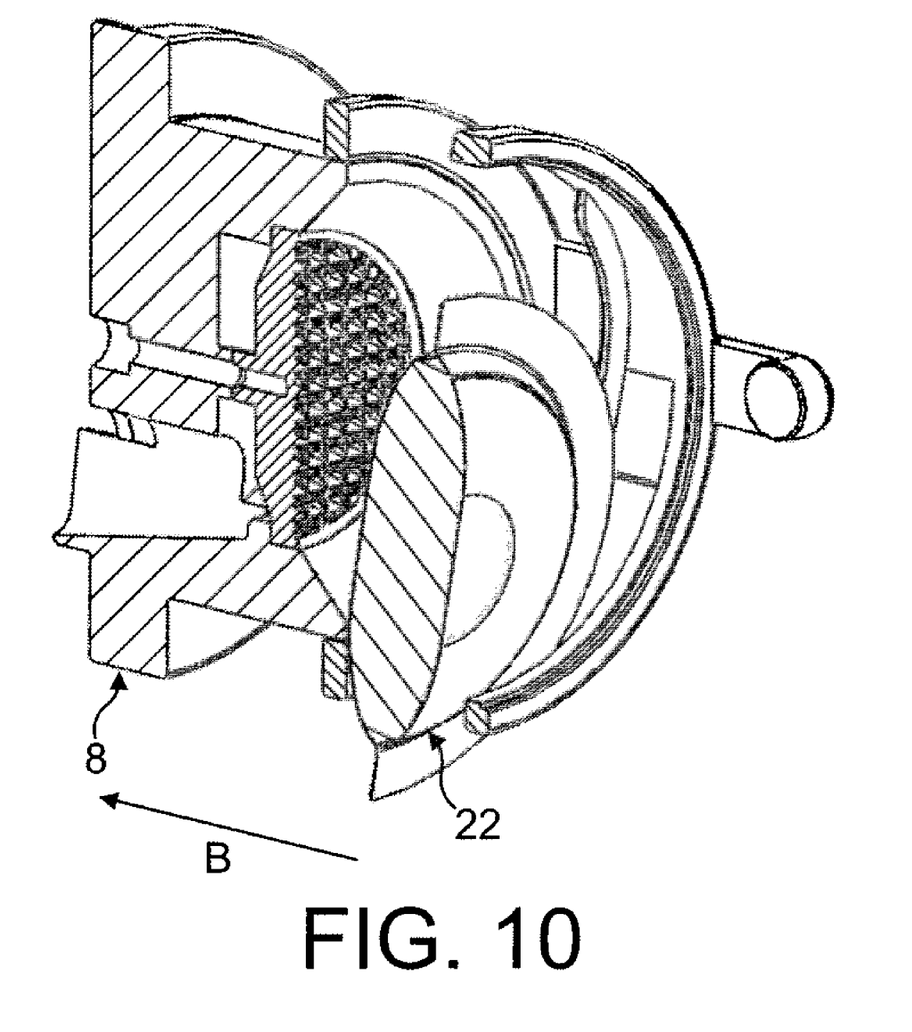

In FIG. 10, the brewing device is re-opened. The first enclosing member (not shown) is drawn away as a result of the user lifting the lever. This results in the second enclosing member 8 to be moved away from the holding member (Direction B indicated in FIG. 10). Since the capsule is positioned in the ejection chamber, the capsule is no longer maintained and can fall dawn by gravity through the lower opening 22. The capsule can be collected in capsule bin, for instance.

Another loading/brewing/ejecting cycle can re-start.

As shown in FIG. 6, in the second member, means 30 for opening the side of the capsule and/or for filtering the beverage can be provided. For instance, it can be formed of a plate comprising elements in relief to puncture the capsule either during closure of the device or under the effect of the pressure building up inside the capsule during the brewing operation. The beverage can drain via channels formed in the plate and through an outlet conduit 31 down to a cup.

There can be several variants to the present embodiment. For instance, the holding member can take various other shapes.

The transversal retaining means 25 may not necessarily be inclined relative to the transversal holding plane but could be parallel to it.

The shape of the transversal retaining means 25 can also vary. It can be rigid such as pins, flanges, needles or flexible such as brushes, plastic blades or other equivalent elements.

The second enclosing member could also be mobile relative to the frame, in which case both enclosing members can be mobile in closure.

The holding member can also be fixed and attached to a non-moving enclosing member whereas a moving enclosing member forces the capsule through the static holding member. For instance, the holding member can be connected to second enclosing member 8 while first enclosing member 7 moves relative to both the second enclosing member 8 and the holding member.

The actuating means can differ from a simple lever. It can comprise a motor controlled by control switch(es) or other control means.

The force transmission means can also be replaced by other means such as a rod system, a cam system or other means.

The capsule can have an asymmetrical shape (e.g., a non-circular contour or with a deeper half-shell and a flat side, etc.).

The invention claimed is:

1. A brewing device for the brewing of a capsule containing beverage ingredients comprising:
   a frame,
   first and second capsule enclosing members for at least partially enclosing the capsule during brewing, with at least one of the first or second enclosing members being mobile along the frame between open and closed positions of the enclosing members about the capsule;
   a closing mechanism to actuate the first enclosing member between the two positions;
   a capsule holding member for receiving the capsule during insertion of the capsule between the first and second enclosing members and for holding the capsule during closing of the enclosing members,
   wherein the holding member has a holding chamber for holding the capsule against gravity between the enclosing members, and a non-supporting area which is placed adjacent the holding chamber for removal of the capsule, and
   wherein the capsule holding member comprises an ejection chamber placed adjacent the holding chamber for the capsule to be removed through the non-supporting area from the device during re-opening of the enclosing members.

2. The brewing device according to claim 1, wherein the second enclosing member and the capsule holding member are arranged to be mobile relative one another so that the capsule is moved, by the second enclosing member traversing the holding chamber, from the holding chamber to the ejection chamber by effect of the two being moved closer to one another.

3. The brewing device according to claim 2, wherein the holding chamber and the ejection chamber are separated by a transversal surface retaining means that opposes a certain resistance in flexure of the flexible edge of the capsule in the longitudinal direction during the longitudinal transfer of the capsule from the holding chamber to the ejection chamber.

4. The brewing device according to claim 3, wherein the transversal surface retaining means comprises at least one portion of ridge arranged to hold the capsule substantially slanted upward orientation along the longitudinal closing direction.

5. The brewing device according to claim 4, wherein the transversal surface retaining means comprises at least two spaced apart arc-shaped surface portions of ridge.

6. The brewing device according to claim 3, wherein one of the enclosing members forces the capsule to pass by flexure of its edge over the transversal surface retaining means during closing of the enclosing members.

7. The brewing device according to claim 2, wherein the holding member includes a holding surface which comprises at least a portion of tube coaxially and circumferentially oriented about the traversing.

8. A beverage machine comprising a brewing device according to claim 1.

9. A brewing capsule system for the brewing of a beverage comprising:
 a capsule comprising a pad containing beverage ingredient(s) formed by the assembly of two packaging walls around a mass of beverage ingredient(s) and a peripheral sealing edge for closing said pad and
 a brewing device according to claim 1.

10. The brewing capsule system according to claim 9, wherein the capsule, when placed in the holding chamber, is pushed by the enclosing member in a substantially coaxial direction.

11. The brewing capsule system according to claim 9, wherein the capsule pad has a disc shape and contains ground coffee.

12. A brewing device for the brewing of a capsule containing beverage ingredients comprising:
 a frame,
 first and second capsule enclosing members for at least partially enclosing the capsule during brewing, with at least one of the first or second enclosing members being mobile along the frame between open and closed positions of the enclosing members about the capsule;
 a closing mechanism to actuate the first enclosing member between the two positions;
 a capsule holding member for receiving the capsule during insertion of the capsule between the first and second enclosing members and for holding the capsule during closing of the enclosing members,
 wherein the holding member has a holding chamber for holding the capsule against gravity between the enclosing members, and a non-supporting area which is placed adjacent the holding chamber for removal of the capsule, and
 wherein the holding chamber comprises at least a coaxial holding surface to hold the edge of the capsule against gravity which has a transversal section which is slightly larger than the second enclosing member so that the second enclosing member can traverse through the holding chamber to push the capsule during the closure.

13. The brewing device according to claim 12, wherein the capsule holding chamber has a cross section which is larger than the second enclosing member, so that the second enclosing member traverses the holding member for both pushing the capsule against the other enclosing member in closure about the capsule and for placing the capsule above the non-supporting area for removal of the capsule during relative re-opening of the holding members.

14. The brewing device according to claim 12, wherein the at least one holding surface is arranged in a non-retractable manner to not substantially mechanically interact with the said traversing enclosing member.

15. The brewing device according to claim 12, wherein the holding chamber comprises an opening for the capsule to be inserted by gravity therethrough.

16. The brewing device according to claim 12, wherein the capsule holding member is fixed with respect to one of the enclosing member.

17. The brewing device according to claim 14, wherein the capsule holding member is fixed to the first enclosing member and wherein the first enclosing member is moved in closure toward the second enclosing member which is fixed relative to the frame.

18. The brewing device according to claim 12, wherein the first enclosing member has a shallow recess with water injection means comprising piercing means for accommodating and piercing the capsule.

19. The brewing device according to claim 12, wherein the first enclosing member is moved between the open and closed position by a closing mechanism which comprises an actuation member.

20. A brewing device for the brewing of a capsule containing beverage ingredients comprising:
 a frame,
 first and second capsule enclosing members for at least partially enclosing the capsule during brewing, with one of the first or second enclosing members being mobile along the frame between open and closed positions of the enclosing members about the capsule;
 a closing mechanism to actuate the first enclosing member between the two positions;
 a capsule holding member for receiving the capsule during insertion of the capsule between the first and second enclosing members and for holding the capsule during closing of the enclosing members, and
 two portions of a tube radially spaced apart with a central opening, wherein the tube portions hold respectively two lower portions of the edge of the capsule,
 wherein the holding member has a holding chamber for holding the capsule against gravity between the enclosing members, and a non-supporting area which is placed adjacent the holding chamber for removal of the capsule, and
 wherein the holding member includes a holding surface which comprises at least a portion of tube coaxially and circumferentially oriented about the mobile enclosing member.

21. A brewing capsule system for the brewing of a beverage comprising:
 a capsule comprising a pad containing beverage ingredient(s) formed by the assembly of two packaging walls around a mass of beverage ingredient(s) and a peripheral sealing edge for closing said pad and
 a brewing device according to claim 20.

22. A brewing device for the brewing of a capsule containing beverage ingredients comprising:
 a frame,
 first and second capsule enclosing members for at least partially enclosing the capsule during brewing, with at least one of the first or second enclosing members being mobile along the frame between open and closed positions of the enclosing members about the capsule;
 a closing mechanism to actuate the first enclosing member between the two positions;
 a capsule holding member for receiving the capsule during insertion of the capsule between the first and second enclosing members and for holding the capsule during closing of the enclosing members,
 wherein the holding member has a holding chamber for holding the capsule against gravity between the enclosing members, and a non-supporting area which is placed adjacent the holding chamber for removal of the capsule, and
 wherein the holding chamber of the holding member is geometrically arranged to hold the capsule in place in a position which is slightly inclined relative to the enclosing plane (P) when the capsule is enclosed between the enclosing members for brewing, and has at least one retaining ramp surface to guide the capsule during insertion and a holding surface, both the retaining ramp surface and holding surface are for retaining the edge of the capsule in the preposition of the capsule.

23. A brewing device for the brewing of a capsule containing beverage ingredients comprising:
a frame,
first and second capsule enclosing members for at least partially enclosing the capsule during brewing, with at least one of the first or second enclosing members being mobile along the frame between open and closed positions of the enclosing members about the capsule;
a closing mechanism to actuate the first enclosing member between the two positions;
a capsule holding member for receiving the capsule during insertion of the capsule between the first and second enclosing members and for holding the capsule during closing of the enclosing members,
wherein the holding member has a holding chamber for holding the capsule against gravity between the enclosing members, and a non-supporting area which is placed adjacent the holding chamber for removal of the capsule, and
wherein the first enclosing member is moved between the open and closed position by a closing mechanism which further comprises variable transmission force means comprises non-circular spur gear means.

24. A brewing device for the brewing of a capsule containing beverage ingredients, comprising:
a frame,
first and second capsule enclosing members for at least partially enclosing the capsule during brewing, wherein at least one of the first or second enclosing members is mobile along the frame between an open and a closed position of the enclosing members about the capsule;
a closing mechanism to actuate the first enclosing member between the two positions;
a capsule holding member for receiving the capsule during insertion of the capsule between the first and second enclosing members and, for holding the capsule during closing of the enclosing members, the capsule holding member includes a holding chamber that is arranged to hold the capsule against gravity between the enclosing members, with the capsule holding member comprising an ejection chamber placed adjacent the holding chamber and a non-supporting area which is placed in the ejection chamber adjacent the holding chamber in order for the capsule to be removed through the non-supporting area from the device during re-opening of the enclosing members; and
a transversal surface retaining means for separating the holding chamber and ejection chamber, with the transversal surface retaining means opposes a certain resistance in flexure of a flexible edge of the capsule in the longitudinal direction during the longitudinal transfer of the capsule from the holding chamber to the ejection chamber;
wherein the capsule holding chamber has a cross-section which is larger than the second enclosing member so that the second capsule enclosing member can traverse through the holding member to force the capsule to position itself from the prepositioning position in the holding chamber to a brewing position in the ejection chamber above the non-supporting area, so that at least a portion of the capsule is forced to flex sufficiently to pass the transversal surface retaining means beyond the holding chamber and so that in the brewing position the holding chamber no longer holds the capsule.

* * * * *